United States Patent
Park

(10) Patent No.: US 8,307,370 B2
(45) Date of Patent: Nov. 6, 2012

(54) APPARATUS AND METHOD FOR BALANCING LOAD IN MULTI-CORE PROCESSOR SYSTEM

(75) Inventor: Jin-man Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1057 days.

(21) Appl. No.: 11/832,732

(22) Filed: Aug. 2, 2007

(65) Prior Publication Data

US 2008/0109814 A1     May 8, 2008

(30) Foreign Application Priority Data

Nov. 6, 2006 (KR) .................. 10-2006-0109136

(51) Int. Cl.
    *G06F 9/46*      (2006.01)
(52) U.S. Cl. ........................... 718/105; 718/104
(58) Field of Classification Search .................. 718/104
See application file for complete search history.

(56) References Cited

U.S. PATENT DOCUMENTS

| | | | | |
|---|---|---|---|---|
| 6,289,369 | B1 * | 9/2001 | Sundaresan ................ | 718/105 |
| 6,842,655 | B1 * | 1/2005 | Collins ...................... | 700/101 |
| 2007/0276973 | A1 * | 11/2007 | Tan et al. ................. | 710/112 |
| 2007/0299980 | A1 * | 12/2007 | Amini et al. ............. | 709/231 |

FOREIGN PATENT DOCUMENTS

JP      2004-213625      7/2004

\* cited by examiner

*Primary Examiner* — Li B Zhen
*Assistant Examiner* — Bradford Wheaton
(74) *Attorney, Agent, or Firm* — NSIP Law

(57) ABSTRACT

An apparatus and method to balance a load in a multi-core processor system. The apparatus includes a data channel module which includes a queue, and which transmits data between a plurality of threads and transmits queue state information regarding the queue, and a data channel management module which periodically analyzes data traffic between the plurality of threads by determining a state of the queue based on the queue state information, and which generates information used to adjust a load of each of the plurality of threads based on a result of the analysis.

13 Claims, 5 Drawing Sheets

APPARATUS AND METHOD FOR BALANCING LOAD IN MULTI-CORE PROCESSOR SYSTEM

CROSS-REFERENCE TO RELATED APPLICATION

This application claims all benefits accruing under 35 U.S.C. §119 from Korean Application No. 2006-109136 filed on Nov. 6, 2006 in the Korean Intellectual Property Office, the disclosure of which is incorporated herein by reference.

BACKGROUND OF THE INVENTION

1. Field of the Invention

Aspects of the present invention relate to an apparatus and method for balancing a load in a multi-core processor system, and more particularly, to an apparatus and method for balancing a load in a multi-core processor system in which data traffic between threads in the multi-core processor system is analyzed in real time and the results of the analysis are transmitted to a scheduler so that the scheduler can effectively balance a load of each of the threads.

2. Description of the Related Art

A process is a running program and is a dynamic entity that constantly varies. Processes consume considerable resources while being active. In order to effectively manage various system resources and to efficiently manage such processes, an operating system (OS) keeps track of the processes and the system resources interacting with the processes.

Conventionally, it is common to install only one processor in a computer system for the purpose of processing all of the processes. However, as technology has improved over time, the amount of data that needs to be processed in various fields has gradually increased. There is a clear limit in how far the performance of single-core CPUs can be improved through the acceleration of clock speeds, because single-core CPUs consume considerable amounts of power and generate a substantial amount of heat. Thus, an increasing number of computer systems are being designed as multi-processor systems equipped with a plurality of processors.

FIG. 1 is a diagram illustrating an example of operations performed by a conventional multi-processor system 100 which processes a plurality of threads, including a first thread 111, a second thread 112, a third thread 113, and a fourth thread 114. A conventional scheduler 121 controls each of the first thread 111, the second thread 112, the third thread 113, and the fourth thread 114. As shown in FIG. 1, a task 110 includes the first, second, third, and fourth threads 111, 112, 113, and 114, and the conventional scheduler 121, which is the kernel of an operating system (OS) 120, allocates each of the first, second, third, and fourth threads 111, 112, 113, and 114 to an optimum CPU according to priority and in consideration of a system load.

In the example shown in FIG. 1, the second thread 112 has a higher processing priority than the first thread 111, and the third thread 113 and the fourth thread 114 have relatively low processing priorities compared to the first thread 111. Accordingly, the first thread 111 is processed by a first processor 131, and the second thread 112 with a higher processing priority than the first, third, and fourth threads 111, 113, and 114, respectively, is processed by both a second processor 132 and a third processor 133. The third thread 113 and the fourth thread 114 with relatively low processing priorities are both processed by a fourth processor 134.

In theory, the operating speed of the multi-processor system 100 increases in proportion to the number of processors used by the multi-processor system 100. In reality, however, the conventional multi-processor system 100 has difficulty manually distributing workloads to the processors in an efficient manner. Thus, the conventional multi-processor system 100 may not be able to achieve maximum performance, because the conventional multi-processor system 100 may fail to effectively utilize a number of processors installed therein.

SUMMARY OF THE INVENTION

Aspects of the present invention provide an apparatus and a method for balancing a load in a multi-core processor system which enhance the performance of a multi-core processor system by analyzing data traffic between threads in the multi-core processor system in real time and transmitting the results of the analysis to a scheduler so that the scheduler can effectively balance the load of each of the threads.

Additional aspects and/or advantages of the invention will be set forth in part in the description which follows and, in part, will be obvious from the description, or may be learned by practice of the invention.

According to an aspect of the present invention, an apparatus to balance a load in a multi-core processor system includes a data channel module which includes a queue, and which transmits data between a plurality of threads and transmits queue state information regarding the queue; and a data channel management module which periodically analyzes data traffic between the plurality of threads by determining a state of the queue based on the queue state information, and which generates information needed to adjust a load corresponding to each of the plurality of threads based on a result of the analysis.

According to another aspect of the present invention, a method of balancing a load in a multi-core processor system includes transmitting data between a plurality of threads using a queue and transmitting queue state information regarding the queue; periodically analyzing data traffic between the plurality of threads by determining a state of the queue based on the queue state information; and generating information used to adjust a load of each of the plurality of threads based on a result of the analysis.

In addition to the example embodiments and aspects as described above, further aspects and embodiments will be apparent by reference to the drawings and by study of the following descriptions.

BRIEF DESCRIPTION OF THE DRAWINGS

A better understanding of aspects of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
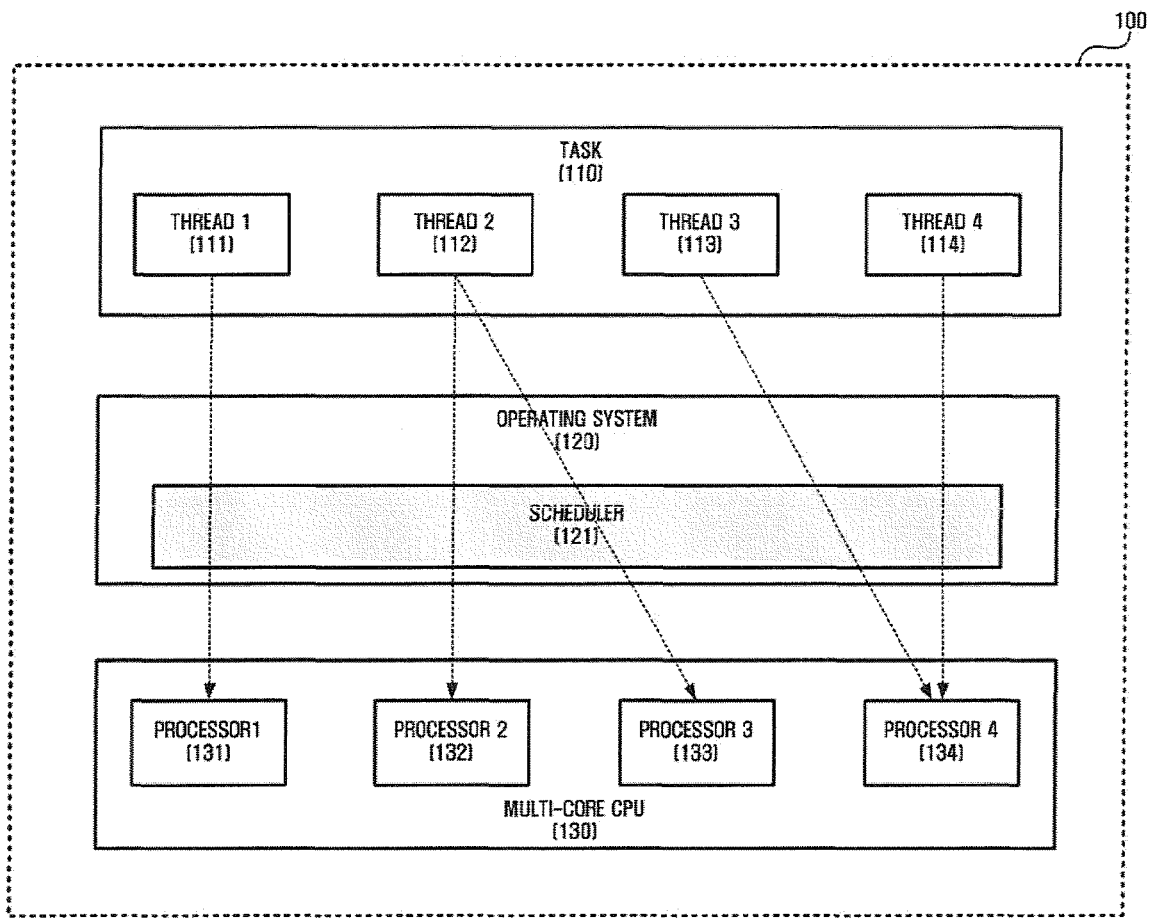
FIG. 1 is a diagram illustrating an example of operations performed by a conventional multi-processor system processing a plurality of threads which are each controlled by a conventional scheduler.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects and examples of the present invention are described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create devices to implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations to implement the functions specified in the flowchart block or blocks.

Each block of the flowchart illustrations may represent a module, segment, or portion of code, which comprises one or more executable instructions to implement the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

Figure 2:
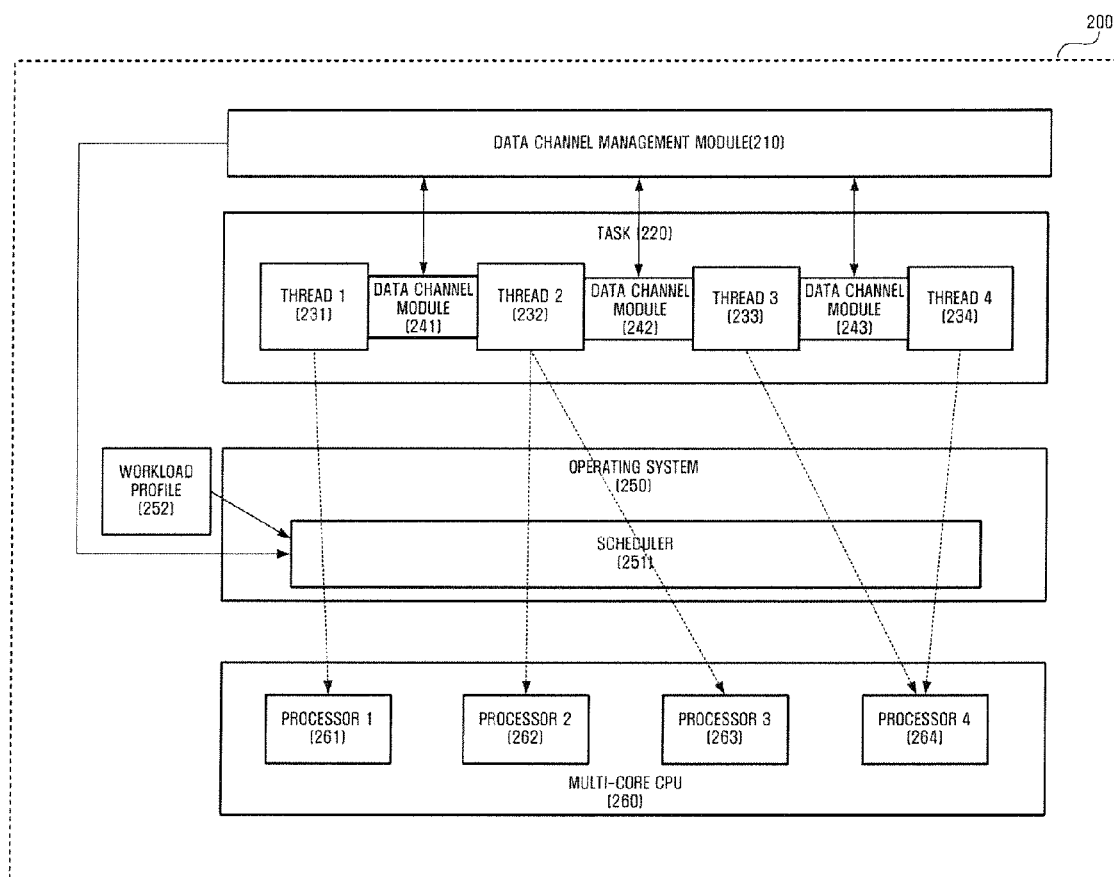
FIG. 2 is a block diagram of an apparatus to balance a load in a multi-core processor system according to an embodiment of the present invention.

FIG. 2 is a block diagram of an apparatus 200 to balance a load in a multi-core processor system according to an embodiment of the present invention. Referring to FIG. 2, the apparatus 200 includes a plurality of threads 231, 232, 233, and 234 which perform operations desired by a user by occupying one or more of the processors 261, 262, 263, and 264, which are also referred to as the central processing units (CPUs) 261, 262, 263, and 264, and which are minimal program units that may be exchanged with each other or other threads, a task 220 which includes the one or more threads (e.g., the threads 231, 232, 233, and 234), and a plurality of data channel modules 241, 242, and 243 which transmit data between the threads 231, 232, 233, and 234 and transmit queue state information. The apparatus 200 further includes a data channel management module 210 which analyzes data traffic between the threads 231, 232, 233, and 234 by periodically examining the queue states of the data channel modules 241, 242, and 243 based on the queue state information transmitted by the data channel modules 241, 242, and 243 and generates information which is used to balance a load of each of the threads 231, 232, 233, and 234 based on a result of the analysis, and a scheduler 251 to select which of the threads 231, 232, 233, and 234 is to be loaded onto one or more of the CPUs 261, 262, 263, and 264 according to the processing priority of the threads 231, 232, 233, and 234 and loads the selected thread onto the one or more of the CPUs 261, 262, 263, and 264 for a predetermined amount of time and/or unloads the selected thread from the one or more CPUs 261, 262, 263, and 264. Also, the apparatus 200 further includes a workload profile 252, which is a description provided by the user regarding the proportion of the amount of time for which each of the threads 231, 232, 233, and 234 occupies one or more of the CPUs 261, 262, 263, and 264 in relation to the whole task 220, a plurality of the CPUs, also referred to as the multi-core processors 261, 262, 263 and 264, which are circuits equipped with a plurality of independent processors and which perform thread-level operations, and an operating system (OS) 250, which is an environment where applications are executed and which manages data input and output operations and scheduling operations that are performed on the plurality of multi-core processors 261, 262, 263, and 264.

The term 'module,' as used herein, refers to, but is not limited to referring to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The following assumptions should be made for aspects of the present invention:

(1) A user may specify, in a workload profile, the number Ti of CPUs that can be occupied by each thread and the proportion Pi of each thread to the whole task 220;

(2) The scheduler 251 may perform scheduling on threads according to Ti and Pi specified in a workload profile;

(3) A user may represent a load balancing standard of the scheduler 251 as standard deviations from an average number of times when a queue of one or more of the data channel modules 241, 242, and 243 is empty or full and other numerical values;

(4) A user may set the widths of the variation ranges of Ti and Pi using the data channel management module 210 during a load balancing operation performed by the scheduler 251; and (5) A user may set the transmission interval of queue state information to the data channel management module 210 by using each of the data channel modules 241, 242, and 243, and may set the examination interval of a queue state of each of the data channel modules 241, 242, and 243 by using each of the data channel management modules 241, 242, and 243.

Referring to FIG. 2, each of the data channel modules 241, 242, and 243 includes a queue having a predetermined size. Each of the threads 231, 232, 233, and 234 transmits data via one or more of the data channel modules 241, 242, and 243. It is understood that the data channel modules 241, 242, and 243 may have different queue sizes from one another or have the same size as each other. When the queues of the data channel modules 241, 242, and 243 are either full or empty, the data channel modules 241, 242, and 243 transmit information to the data channel management module 210 indicating that the queues of the data channel modules 241, 242, and 243 are either full or empty.

For convenience, the state when the queues of the data channel modules 241, 242, and 243 are full and the state when the queues of the data channel modules 241, 242, and 243 are empty will hereinafter be referred to as a first state and a second state, respectively. Furthermore, since each of the data channel modules 241, 242, and 243 include a queue, the states of the queues of the data channel modules 241, 242, and 243 will hereinafter be referred to as the states of the data channel modules 241, 242, and 243. Thus, for example, if the first data channel module 241 is said to be in a first state, the queue included in the first data channel module 241 is full.

The data channel management module 210 analyzes data traffic between the threads 231, 232, 233, and 234 by periodically examining the queue states of the data channel modules 241, 242, and 243 based on the queue state information transmitted by the data channel modules 241, 242, and 243. Then, the data channel management module 210 generates information which is used to balance the load of each of the threads 231, 232, 233, and 234 based on the results of the analysis. By balancing the load of each of the threads 231, 232, 233, and 234, the data channel management module 210 efficiently controls a manner in which the plurality of threads 231, 232, 233, 234 interact with the plurality of processors 261, 262, 263, and 264. Specifically, the data channel management module 210 determines the number Ti of CPUs that can be occupied by each of the threads 231, 232, 233, and 234 and the proportion Pi of each of the threads 231, 232, 233, and 234 to the whole task 220 on the scheduler 251 in real time, thereby dynamically adjusting the scheduling priority of the threads 231, 232, 233, and 234.

The data channel management module 210 periodically calculates the number of times when the data channel modules 241, 242, and 243 are placed in the first state and the number of times when the data channel modules 241, 242, and 243 are placed in the second state over a predetermined time period. Then, based on the results of the counting, the data channel management module 210 calculates an average of the number of times when the data channel modules 241, 242, and 243 are placed in the first state and an average of the number of times when the data channel modules 241, 242, and 243 are placed in the second state by repeating the calculating for the time period a number of times. It is understood that the data channel management module 210 is not limited to calculating only an exact average, and may instead calculate another value, such as a weighted average which is weighted according to various factors. Furthermore, it is understood that the data channel management module 210 is not required to periodically calculate a number of times when the data channel modules 241, 242, and 243 are placed in the first state or the second state, and may instead calculate the number of times only once, or may receive this information from an external source without performing any calculations.

Figure 3:
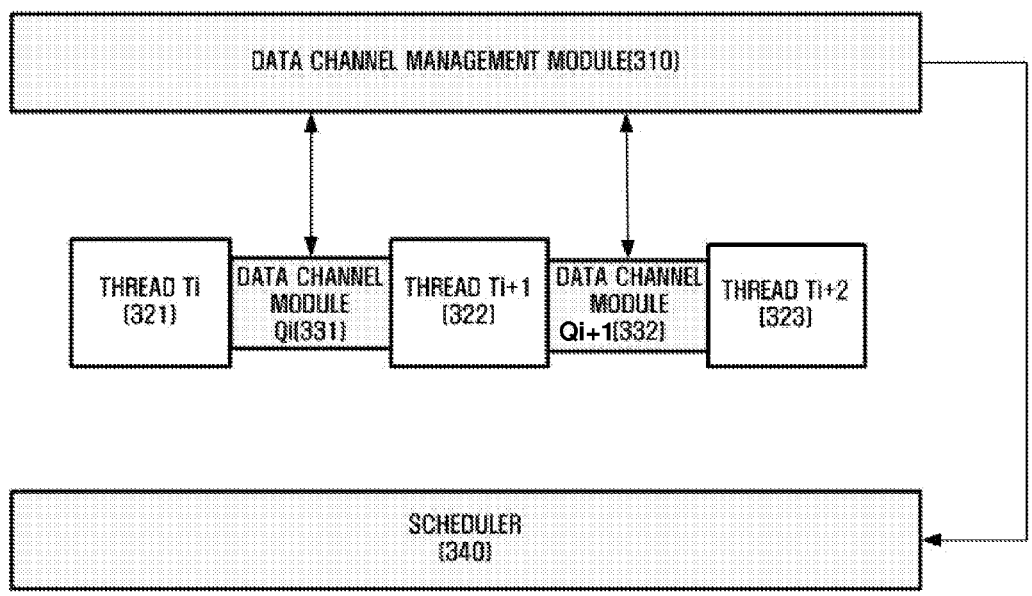
FIG. 3 is a diagram illustrating the relationship between a data channel management module and data channel modules according to an embodiment of the present invention.

FIG. 3 is a diagram illustrating the relationship between a data channel management module 310 and data channel modules Qi (331) and Qi+1 (332), according to an embodiment of the present invention. Referring to FIG. 3, assuming that a task (not shown) includes three threads, i.e., thread Ti (321), thread Ti+1 (322), and thread Ti+2 (323), the thread Ti (321) and the thread Ti+1 (322) transmit data via the data channel module Qi (331) and the thread Ti+1 (322) and the thread Ti+2 (323) transmit data via the data channel module Qi+1 (332).

Hereinafter, for convenience, a thread that transmits data will hereinafter be referred to as a source thread, and a thread that receives data will hereinafter be referred to as a sink thread. Thus, for example, if thread Ti (321) transmits data to thread Ti+1 (322), thread Ti (321) is referred to as a source thread and thread Ti+1 (322) is referred to as a sink thread. Further, if the thread Ti+1 (322) transmits data to the thread Ti+2 (323), the thread Ti+1 (322) is referred to as a source thread and the thread Ti+2 (323) is referred to as a sink thread. It is understood that aspects of the present invention may be applied to more or less than the three threads Ti (321), Ti+1 (322), and Ti+2 (323), and may be applied to a multi-core CPU having more or less than the four processors 261, 262, 263, and 264 included in the multi-core CPU 260.

If the data channel module Qi (331) is placed in the first state, i.e., a full state, during the transmission of data from the thread Ti (321) to the thread Ti+1 (322), the thread Ti (321) is not able to transmit additional data to the data channel module Qi (331), but the thread Ti+1 (322) is able to keep receiving data from the data channel module Qi (331) because the queue of the data channel module Qi (331) is in a full state. If the data channel module Qi (331) is placed in the second state, i.e., an empty state, during the transmission of data from the thread Ti (321) to the thread Ti+1 (322), the thread Ti (321) is able to keep transmitting data to data channel module Qi (331), but the thread Ti+1 (322) is not able to keep receiving data from the data channel module Qi (331) because the queue of the data channel module Qi (331) is empty. Similarly, the thread Ti+1 (322) and thread Ti+2 (323) are governed by the same above-described principles as the principles governing the thread Ti (321) and the thread Ti+1 (322).

When data channel modules Qi (331) and Qi+1 (332) are placed in the first state or the second state, they are likely to cause an imbalance between the scheduler occupancy of a source thread and the scheduler occupancy of a sink thread. This imbalance prevents the multi-core CPU 260, shown in FIG. 2, from achieving maximum performance. The data channel modules Qi (331) and Qi+1 (332) transmit queue state information to the data channel management module 310 when respective queues of the data channel modules Qi (331) and Qi+1 (332) are placed in either the first state or the second state, i.e., become full of data or empty of data, respectively.

The data channel management module 310 periodically counts the number of times when the data channel modules Qi (331) and Qi+1 (332) are placed in the first state and the number of times when the data channel modules Qi (331) and Qi+1 (332) are placed in the second state over the predetermined time period by referring to the queue state information transmitted by the data channel modules Qi (331) and Qi+1 (332). Based on this periodic counting, the data channel management module 310 calculates an average of the number of times when the data channel modules Qi (331) and Qi+1 (332) are placed in the first state and an average of the number of times when data channel modules Qi (331) and Qi+1 (332) are placed in the second state during the predetermined time period. Hereinafter, for convenience, the average of the number of times when the data channel modules Qi (331) and Qi+1 (332) are placed in the first state and the average of the number of times when the data channel modules Qi (331) and Qi+1 (332) are placed in the second state will hereinafter be referred to as a first-state average and a second-state average, respectively.

The data channel management module 310 examines the queue states of data channel modules Qi (331) and Qi+1 (332) at regular intervals of the predetermined time period, which is a time period defined by a user. During this predetermined time period, the data channel management module 310 compares the number of times when the data channel modules Qi (331) and Qi+1 (332) are placed in the first state with the first-state average and compares the number of times when the data channel modules Qi (331) and Qi+1 (332) are placed in the second state with the second-state average. Thereafter, the data channel management module 310 balances the load of each of the threads Ti (321), Ti+1 (322), and Ti+2 (323) according to the results of the comparison.

For example, if the thread Ti (321) is a source thread, the thread Ti+1 (322) is a sink thread, and the data channel module Qi (331) transmits data of the thread Ti (321) to the thread Ti+1 (322), the data channel management module 310 periodically compares the number of times when the data channel module Qi (331) is placed in the first state, i.e., a full state, with the first-state average. If the result of the comparison indicates that the number of times when the data channel module Qi (331) is placed in the first state is greater than the first-state average, the data channel management module 310 accordingly determines that the processing speed of the thread Ti (321) is faster than the processing speed of thread Ti+1 (322), because the thread Ti (321) transmits data to the data channel module Qi (331) at a faster rate than a rate at which the thread Ti+1 (322) receives the data, thereby filling up the queue of the data channel module Qi (331) with data.

In addition, the data channel management module 310 periodically compares the number of times when the data channel module Qi (331) is placed in the second state, i.e., an empty state, with the second-state average. If the result of the comparison indicates that the number of times when the data channel module Qi (331) is placed in the second state is greater than the second-state average, the data channel management module 310 determines that the processing speed of the thread Ti (321) is slower than the processing speed of the thread Ti+1 (322), because the thread Ti (321) transmits data to the data channel module Qi (331) at a slower rate than a rate at which the thread Ti+1 (322) receives the data, thereby emptying the queue of the data channel module Qi (331) of data.

Using the above-described algorithm, if the data channel management module 310 determines that the processing speed of the thread Ti (321) is faster than the processing speed of the thread Ti+1 (322), the data channel management module 310 may transmit various types of requests, such as a request for the scheduler 340 to reduce the number of CPUs occupied by the thread Ti (321) or to reduce the scheduler occupancy of the thread Ti (321), or may transmit a request for the scheduler 340 to increase the number of CPUs occupied by the thread Ti+1 (322) or the scheduler occupancy of the thread Ti+1 (322). On the other hand, if the data channel management module 310 determines that the processing speed of the thread Ti (321) is slower than the processing speed of the thread Ti+1 (322), the data channel management module 310 may transmit a request for the scheduler 340 to increase the number of CPUs occupied by the thread Ti (321) or increase the scheduler occupancy of thread Ti (321), or may transmit a request for the scheduler 340 to reduce the number of CPUs occupied by the thread Ti+1 (322) or to reduce the scheduler occupancy of the thread Ti+1 (322). It is understood that the data channel management module 310 may transmit various combinations of the above-described requests, as well as other types of requests designed to balance processing operations of the threads Ti (321) and Ti+1 (322). For example, if the data channel management module 310 determines that the processing speed of the thread Ti (321) is faster than the processing speed of the thread Ti+1 (322), the data channel management module 310 may simultaneously transmit requests for the scheduler 340 to reduce the number of CPUs occupied by the thread Ti (321), to reduce the scheduler occupancy of the thread Ti (321), to increase the number of CPUs occupied by the thread Ti+1 (322), and to increase the scheduler occupancy of the thread Ti+1 (322). Alternatively, the data channel management module 310 may transmit one or more than one but less than all of these various types of requests to the scheduler 340.

Figure 4:
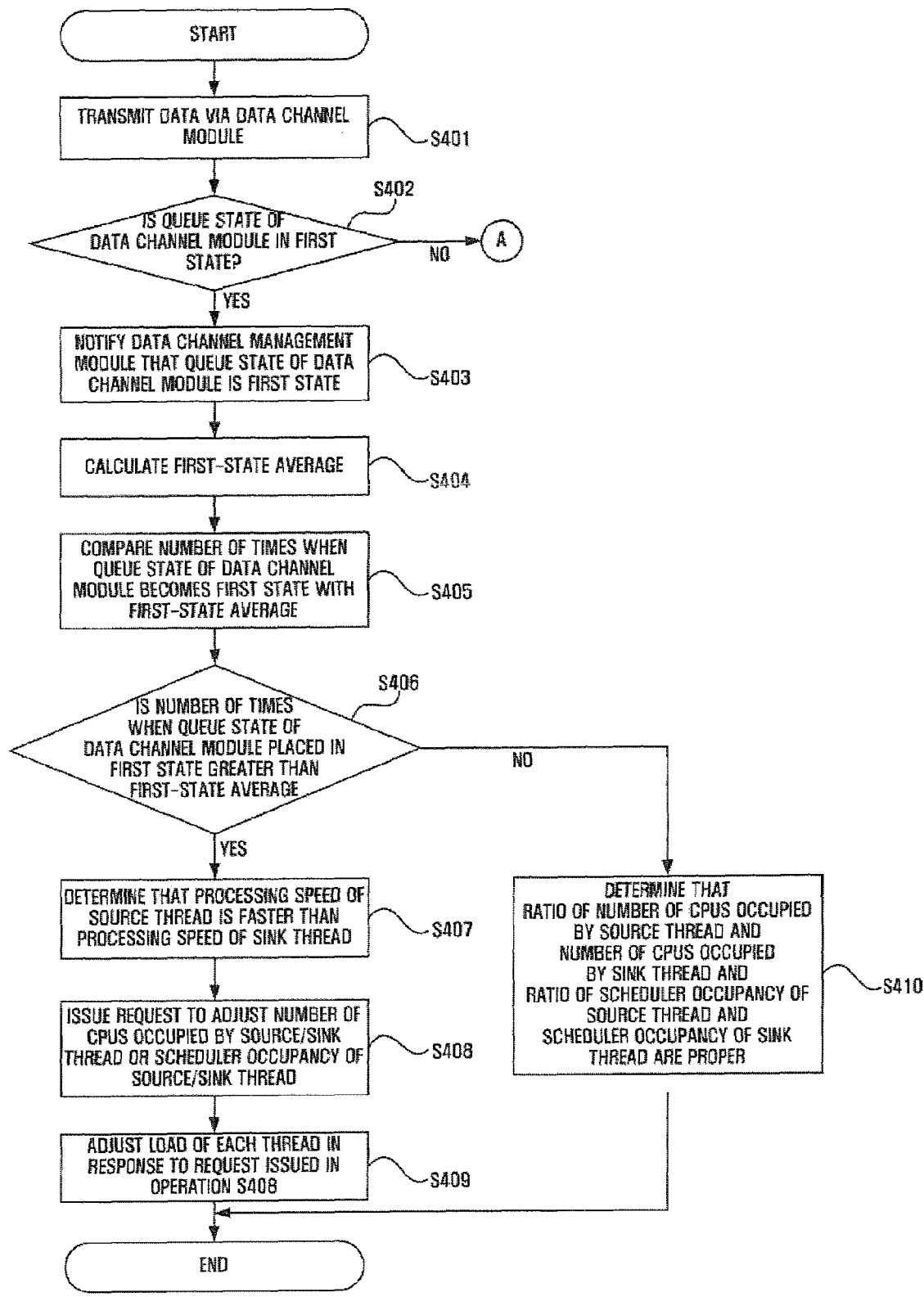
FIGS. 4 and 5 are flowcharts illustrating a method of balancing a load of each thread according to an embodiment of the present invention.
Figure 5:
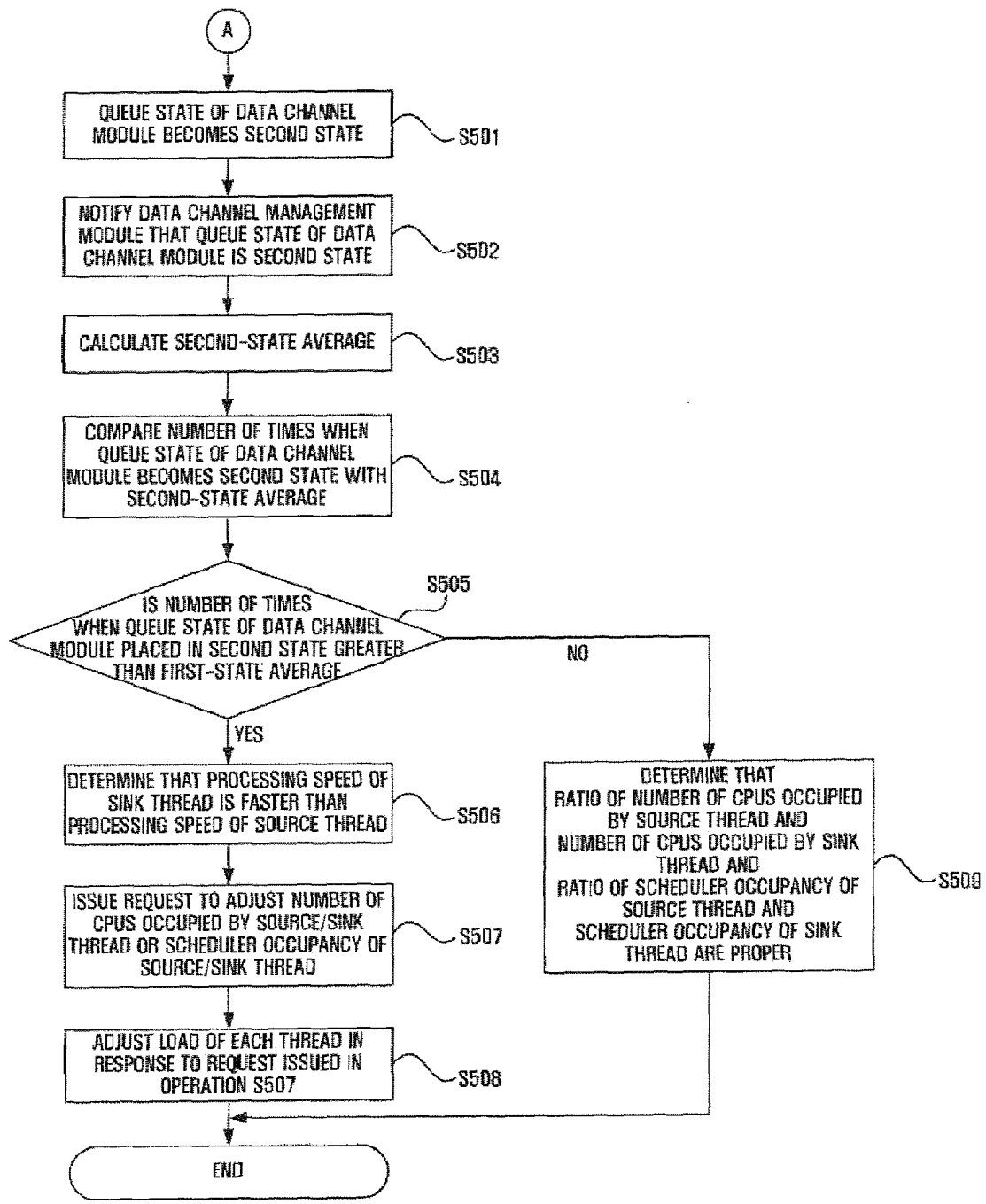

FIGS. 4 and 5 are flowcharts illustrating a method of balancing the load of threads according to an embodiment of the present invention. The method illustrated in FIGS. 4 and 5 will hereinafter be described in detail with reference to FIG. 3.

Referring to FIGS. 3 and 4, in operation S401, the source thread Ti (321) transmits data to the sink thread Ti+1 (322) via the data channel module Qi (331). When the data channel module Qi (331) is placed in either the first state or the second state, the data channel module Qi (331) transmits queue state information indicating that the data channel module Qi (331) is in the first state or the second state to the data channel management module 310.

Operations performed when the data channel module Qi (331) is in the first state will hereinafter be described in detail with reference to FIG. 4, and operations performed when the data channel module Qi (331) is in the second state will be described later in detail with reference to FIG. 5. Referring to FIG. 4, in operation S403, if it is determined in operation S402 that the data channel module Qi (331) is in the first state, the data channel module Qi (331) transmits a first type of queue state information indicating that the data channel module Qi (331) is in the first state to the data channel management module 310. As described earlier, when the data channel module Qi (331) is in the first state, the source thread Ti (321) cannot transmit additional data to the data channel module Qi (331) any further, whereas the sink thread Ti+1 (322) can keep receiving data from the data channel module Qi (331).

In operation S404, the data channel management module 310 periodically determines the queue states of the data channel modules Qi (331) and Qi+1 (332) over a predetermined time period based on queue state information transmitted by the data channel modules Qi (331) and Qi+1 (332), counts the number of times when the data channel modules Qi (331) and Qi+1 (332) are placed in the first state, and calculates a first-state average of the data channel module Qi (331) and Qi+1 (332) by averaging the results of the counting. It is understood that the data channel management module 310 is not required to count the number of times when both of the data channel modules Qi (331) and Qi+1 (332) are placed in the first state, and may instead only count the number of times when one or the other of the data channel modules Qi (331) and Qi+1 (332) is placed in the first state. The predetermined time period in which the data channel management module 310 periodically determines the queue states of the data channel modules Qi (331) and Qi+1 (332) may be determined by a user and may change over time or according to other conditions. In operation S405, the data channel management module 310 counts the number of times when the data channel module Qi (331) is placed in the first state over the predetermined time period, and compares the result of the counting with the first-state average calculated in operation S404.

In operation S406, it is determined whether the number of times when the data channel module Qi (331) is placed in the first state over the predetermined time period is greater than the first-state average based on the result of the comparison performed in operation S405. If it is determined in operation S406 that the number of times when the data channel module Qi (331) is placed in the first state over the predetermined time period is greater than the first-state average, then in operation S407 the data channel management module 310 determines that the processing speed of the thread Ti (321) is faster than the processing speed of the thread Ti+1 (322). If the data channel management module 310 determines that the processing speed of the thread Ti (321) is faster than the processing speed of the thread Ti+1 (322) in operation S407, then in operation S408, the data channel management module 310 issues a request to the scheduler 340 to reduce the number of CPUs 261, 262, 263, and 264 occupied by the thread Ti (321) or reduce the scheduler occupancy of the thread Ti (321), or issues a request to increase the number of CPUs 261, 262, 263, and 264 occupied by the thread Ti+1 (322) or to increase the scheduler occupancy of the thread Ti+1 (322). It is understood that the data channel management module 310 may issue various combinations of these requests. Then, in operation S409, the scheduler 340 adjusts the load of each of the threads Ti (321) and Ti+1 (322) in real time in response to the request issued by the data channel management module 310 in operation S408 and according to the circumstances of the corresponding multi-core CPU 260 (FIG. 2).

Meanwhile, if it is determined in operation S406 that the number of times when the data channel module Qi (331) is placed in the first state over the time period is less than the first-state average, the data channel management module 310 determines that the ratio of the number of CPUs occupied by the thread Ti (321) and the number of CPUs occupied by the thread Ti+1 (322) and the ratio of the scheduler occupancy of the thread Ti (321) and the scheduler occupancy of the thread Ti+1 (322) are both proper. After operations S409 or S410 are completed, the method may return to S404 or terminate.

FIG. 5 illustrates the operations performed when it is determined in operation S402 that the data channel module Qi (331) is in the second state. Referring to FIG. 5, in operation S501, the data channel module Qi (331) is determined to be in the second state. In operation S502, the data channel module Qi (331) transmits a second type of queue state information to the data channel management module 310 indicating that the queue of the data channel module Qi (331) is in the second state. As described earlier, when the data channel module Qi (331) is in the second state, the thread Ti (321) can keep transmitting data to the data channel module Qi (331), but the thread Ti+1 (322) cannot receive additional data from the data channel module Qi (331).

In operation S503, the data channel management module 310 determines the queue states of the data channel modules Qi (331) and Qi+1 (332) based on queue state information transmitted by the data channel modules Qi (331) and Qi+1 (332) at regular intervals of the predetermined time period, which is defined by a user, counts the number of times when the data channel modules Qi (331) and Qi+1 (332) are placed in the second state, and calculates a second-state average by averaging the results of the counting. It is understood that the data channel management module 310 is not required to count the number of times when both of the data channel modules Qi (331) and Qi+1 (332) are placed in the second state, and may instead only count the number of times when one or the other of the data channel modules Qi (331) and Qi+1 (332) is placed in the second state. In operation S504, the data channel management module 310 counts the number of times when the data channel module Qi (331) is placed in the second state, and compares the result of the counting with the second-state average.

In operation S505, it is determined whether the number of times when the data channel module Qi (331) is placed in the second state is greater than the second-state average based on the result of the comparison performed in operation S504. If it is determined in operation S505 that the number of times when the data channel module Qi (331) is placed in the second state is greater than the second-state average, then in operation S506, the data channel management module 310 determines that the processing speed of the thread Ti (321), i.e., the source thread, is slower than the processing speed of the thread Ti+1 (322), i.e, the sink thread. Then, in operation S507, the data channel management module 310 issues a request to the scheduler 340 to increase the number of CPUs occupied by the thread Ti (321) or the scheduler occupancy of the thread Ti (321), or issues a request to reduce the number of CPUs occupied by the thread Ti+1 (322) or the scheduler occupancy of the thread Ti+1 (322). It is understood that the data channel management module 310 may issue various combinations of these requests. Then, in operation S508, the scheduler 340 adjusts the load of each of the threads Ti (321) and Ti+1 (322) in real time in response to the request issued by the data channel management module 310 in operation S507 and according to the circumstances of the corresponding multi-core CPU 260 (FIG. 2).

Meanwhile, if it is determined in operation S505 that the number of times when the data channel module Qi (331) is placed in the second state is less than the second-state average, then in operation S509, the data channel management module 310 determines that the ratio of the number of CPUs occupied by the thread Ti (321) and the number of CPUs occupied by the thread Ti+1 (322) and the ratio of the scheduler occupancy of the thread Ti (321) and the scheduler occupancy of the thread Ti+1 (322) are both proper. After operations S508 or S509 are completed, the method may return to operation S503 or may terminate.

As described above with reference to FIGS. 4 and 5, the data channel management module 310 analyzes data traffic between the source thread Ti (321) and the sink thread Ti+1 (322), and generates information used to adjust the load of each of the thread Ti (321) and the thread Ti+1 (322) based on the results of the analysis. In other words, the data channel management module 310 dynamically adjusts the scheduling priority of the thread Ti (321) by determining the number Ti of CPUs that can be occupied by the thread Ti (321) and the proportion Pi of the thread Ti (321) to a whole task 220 on the scheduler 340 in real time.

As described above, the apparatus and method to balance a load in the multi-core CPU 260 according to aspects of the present invention enhances the performance of the multi-core CPU 260 by adjusting the CPU occupancy of each thread in real time and according to the circumstances of the multi-core CPU 260.

Various components of the apparatus 200 shown in FIG. 2, such as the data channel management module 210 and the data channel modules 241, 242, and 243, can be integrated into a single control unit, or alternatively, can be implemented in software or hardware, such as, for example, an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In addition, aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. Many modifications, permutations, additions and sub-combinations may be made to adapt the teachings of the present invention to a particular situation without departing from the scope thereof. Alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory devices. Furthermore, the software modules as described can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims.

What is claimed is:

1. An apparatus to balance a load in a multi-core processor system, the apparatus comprising:
    a plurality of processing cores configured to process a plurality of threads;
    a data channel module comprising a queue that stores data that is transmitted between the plurality of threads while the plurality of threads are being processed by the plurality of processing cores, wherein the data channel module generates queue state information each time the queue is full and/or each time the queue is empty;
    a data channel management module configured to analyze data traffic between the plurality of threads based on the queue state information, and to generate load adjustment information used to adjust a load of the plurality of threads based on the analyzed data traffic between the plurality of threads while the plurality of threads are being processed by the plurality of processing cores; and
    a scheduler configured to adjust the load of the plurality of processing cores by dynamically adjusting the processing core occupancy of one or more threads after the plurality of threads have been loaded to the plurality of processing cores, based on the load adjustment information generated by the data channel management module,
    wherein the data channel management module periodically counts a number of times that the queue is empty or the number of times the queue is full, over a predetermined time period, and calculates a state average by averaging a result of the periodic counting, and
    the scheduler adjusts the load of the plurality of processing cores based on a comparison of the number of times that the queue is empty or the number of times the queue is full, during the predetermined time period, in comparison to the state average.

2. The apparatus of claim 1, wherein the scheduler selects one thread among the plurality of threads to be loaded or unloaded onto or from a processing core according to a processing priority of the plurality of threads, and to load the selected thread onto the processing core for a predefined amount of time or unload the selected thread from the processing core.

3. The apparatus of claim 2, wherein the data channel management module transmits, in real time, an indicator of at least one of the plurality of processing cores to be occupied by each of the plurality of threads or a scheduler occupancy of each of the plurality of threads to the scheduler.

4. The apparatus of claim 1, wherein the data channel management module compares a number of times that the queue is full during the predetermined time period with the first-state average, and issues at least one of a request to adjust a number of processing cores occupied by one of the plurality of threads or a request to adjust the scheduler occupancy of the one thread to the scheduler based on the result of the comparison.

5. The apparatus of claim 1, wherein the data channel management module compares a number of times that the queue is empty during the predetermined time period with the second-state average, and issues at least one of a request to adjust a number of processing cores occupied by one of the plurality of threads or a request to adjust the scheduler occupancy of the one thread based on the result of the comparison.

6. The apparatus of claim 4, wherein the plurality of threads comprises a source thread which transmits data to the queue and a sink thread which receives the data from the queue.

7. The apparatus of claim 1, wherein the dynamically adjusting comprises unloading a first a thread from a first processing core and loading a second thread to the first processing core for a predetermined amount of time.

8. A method of balancing a load in a multi-core processor system, the method comprising:
processing a plurality of threads using a plurality of processing cores of the multi-core processor;
storing, in a queue, data transmitted between the plurality of threads while the plurality of threads are being processed by a plurality of processing cores of the multi-core processor system;
generating queue state information each time the queue is empty and/or each time the queue is full during the processing;
analyzing data traffic between the plurality of threads based on the queue state information;
generating load information used to adjust a load of the plurality of threads based on the analyzed data traffic between the plurality of threads while the plurality of threads are being processed by the plurality of processing cores; and
adjusting a load of the processing cores by dynamically adjusting the processing core occupancy of one or more threads after the plurality of threads have been loaded to the processing cores, based on the generated load information,
wherein a data channel management module of the multi-core processor system periodically counts a number of times that the queue is empty or the number of times the queue is full, over a predetermined time period, and calculates a state average by averaging a result of the periodic counting, and
a scheduler of the multi-core processor system adjusts the load of the plurality of processing cores based on a comparison of the number of times that the queue is empty or the number of times the queue is full, during the predetermined time period, in comparison to the state average.

9. The method of claim 8, further comprising:
selecting one thread among the plurality of threads to be loaded onto or unloaded from a processing core according to a processing priority of the plurality of threads, and loading or unloading the selected thread onto the processing core for a predefined amount of time or unloading the selected thread from the processing core.

10. The method of claim 8, wherein the generating comprises transmitting, in real time, an indicator of at least one of a number of processors to be occupied by each of the plurality of threads or a scheduler occupancy of each of the plurality of threads to a scheduler.

11. The method of claim 8, wherein the generating further comprises comparing a number of times that the queue is empty over the predetermined time period with the first-state average, and issuing one of a request to adjust the number Of processing cores occupied by one of the plurality of threads or a request to adjust the scheduler occupancy of one of the plurality of threads to the scheduler based on the result of the comparison.

12. The method of claim 8, wherein the generating further comprises comparing a number of times that the queue is empty over the predetermined time period with the second-state average, and issuing one of a request to adjust the number of processing cores occupied by one of the plurality of threads or a request to adjust the scheduler occupancy of one of the plurality of threads to the scheduler based on the result of the comparison.

13. The method of claim 8, wherein the dynamically adjusting comprises unloading a first a thread from a first processing core and loading a second thread to the first processing core for a predetermined amount of time.

* * * * *